MAGNETIC CORE BINARY DEVICES

Filed March 18, 1955 2 Sheets-Sheet 1

INVENTOR.
ARTHUR W. LO
BY Morris A. Lobkin [signature]
ATTORNEY

Oct. 20, 1964 A. W. LO 3,153,778

MAGNETIC CORE BINARY DEVICES

Filed March 18, 1955

2 Sheets-Sheet 2

INVENTOR.
ARTHUR W. LO

BY Morris A. Pahkin

ATTORNEY 3,153,778
MAGNETIC CORE BINARY DEVICES
Arthur W. Lo, Elizabeth, N.J., assignor to Radio Corporation of America, a corporation of Delaware
Filed Mar. 18, 1955, Ser. No. 495,270
33 Claims. (Cl. 340—174)

This invention relates to devices that have a binary mode of operation and that may be employed for storage, switching, and logical operations in information handling systems.

Elements made of materials having substantially rectangular hysteresis loops generally have two remanent states and may be employed as binary information storage elements. These elements, such as ferromagnetics and ferroelectrics, have the advantages of small size, relatively small power supply, and relatively long life. Circuits employing rectangular hysteresis loop elements that have been devised include stepping registers, bistable trigger circuits, counters, switching circuits, and logical circuits in information handling systems such as computers. Generally in such circuits, a temporary storage is needed for transferring signals from one storage element to the next. Preferably, this temporary storage should operate at high speeds and should not introduce any time delay of signals beyond that necessary for the operation of the binary elements. Examples of prior magnetic stepping registers are described in the article "Static Magnetic Storage and Delay Line," by Wang and Woo in the "Journal of Applied Physics," January 1950, page 49; and in the article "Magnetic Shift Register Using One Core Per Bit," by Kodis et al., in the "Convention Record of I.R.E.," 1953 National Convention, Part 7—Electronic Computers, 1953, Institute of Radio Engineers, page 38.

It is among the objects of this invention to provide:

A new and improved binary device employing rectangular hysteresis elements as dynamic circuit components;

A new and improved system for transferring signals between binary elements;

A magnetic system that is simple in construction and that can be used for storage, switching, and logical operations;

A magnetic stepping register that can be operated at high speeds.

In accordance with this invention a plurality of binary elements are employed. A first means applies signals to the elements to change them from one of two remanent states to the other. The elements produce different signals when changed from one state and the other, respectively. A circuit for transferring signals from a first element to a second element includes a second means that is operative in predetermined time relationship to the first means and that applies signals to the second element subsequent to termination of the signals produced by the first element. The transfer circuit also includes a temporary storage means coupled between the first and second elements and responsive to the different signals produced by the first element for respectively presenting impedances of different magnitudes to the second means signals. These different impedance magnitudes enable and inhibit, respectively, the effect of the second means signals.

A feature of this invention is the use of a semi-conductive device characterized by minority carrier storage as the storage means.

This application describes features of an invention described and claimed in an application by A. W. Lo et al. Serial No. 495,108, filed March 18, 1955, now Patent No. 2,866,178, dated December 23, 1958, and assigned to the assignee of this application.

The foregoing and other objects, the advantages and novel features of this invention, as well as the invention itself both as to its organization and mode of operation, may be best understood from the following description when read in connection with the accompanying drawing, in which like reference numerals refer to similar parts, and in which.

Figures 1, 2:
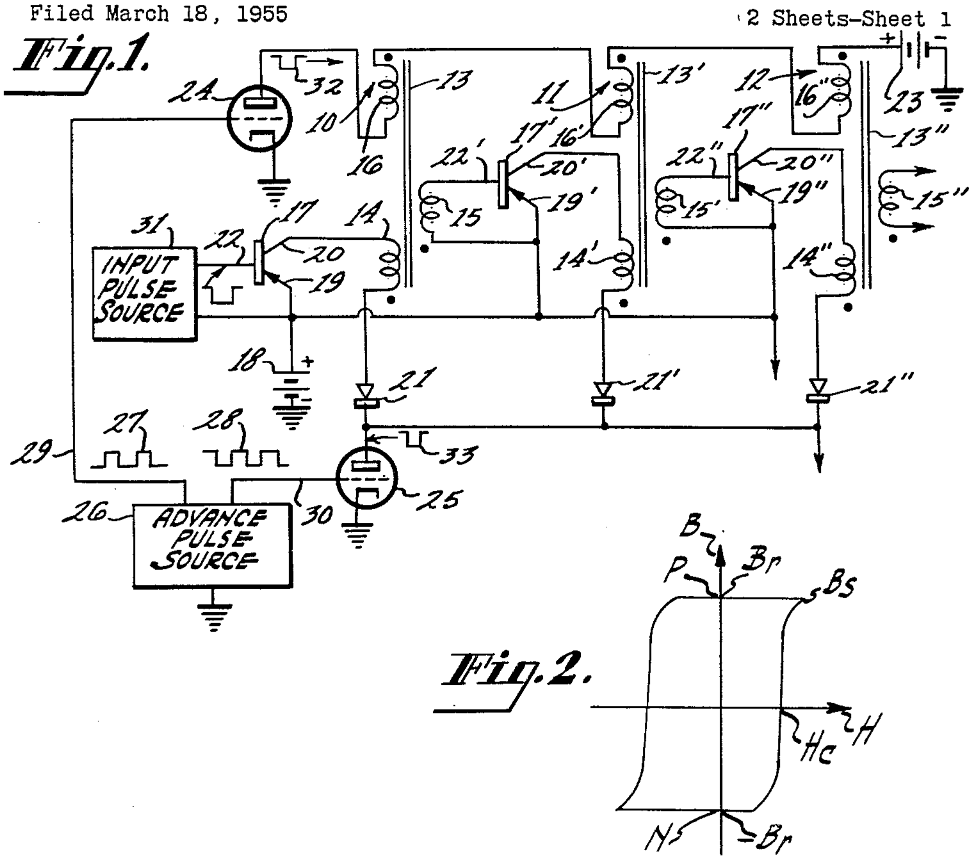
FIGURE 1 is a schematic circuit diagram of a stepping register, in which transistors are employed as temporary storage elements.
FIGURE 2 is an idealized graph of the hysteresis characteristic of magnetic cores that may be employed in the circuit of FIGURE 1.

In FIGURE 1, three stages 10, 11, and 12 of a stepping register are shown. The stages are identical, and, therefore, the construction of only the first stage 10 is described in detail. Corresponding parts in the second and third stages 11 and 12 are referenced by the same numerals with the addition of a prime (′) and double prime (″), respectively. This reference number system is also used in the FIGURES 3 to 7 inclusive of the drawing.

The binary storage element of the first stage 10 is shown as a magnetic core 13, that is preferably made of material having a substantially rectangular hysteresis curve of the type shown in FIGURE 2. Desirable characteristics of the core material are a high saturation flux density $B_s$, a high residual flux density $B_r$ substantially equal to $B_s$, and a low coercive force $H_c$. Opposite magnetic states or directions of flux in the core are represented by P and N. If a magnetizing force in the direction P is applied to the core which is already in state P, essentially no change in the core flux density takes place. Ideally, if the magnetizing force in a flux reversing direction is less than the coercive force, the flux density does not change, and the residual magnetism is substantially unchanged. In practice, the magnetic cores are sufficiently close to the ideal to have two stable remanent states.

Linked to the first core 13 are an input winding 14, an output winding 15, and an advance winding 16. A transistor 17 is connected in circuit with the input winding 14. The transistor 17, by way of illustration, may be of the P-N-P junction type. A source of direct voltage 18 common to all of the stages 10, 11, 12 is connected to the emitter 19 of the transistor 17. The collector 20 is connected to one terminal of the input winding 14, the other terminal of which is connected through a diode 21 in the forward direction to the anode of a common driving tube 25. One terminal of the output winding 15 is connected to the base 22′ of the transistor 17′ of the second stage 11, and the other terminal of the output winding 15 is connected to the emitter 19′ of the second stage transistor 17′. Succeeding stages 11 and 12 are coupled in the same manner.

The advance windings 16, 16′, 16″ are all connected in series between a source 23 of direct voltage and the anode of another driving tube 24. An advance pulse source 26 supplies two trains of advance pulses 27 and 28 on separate conductors 29 and 30, respectively, which are connected to the grids of the driving tubes 24 and 25, respectively. This advance pulse source 26 may be, for example, a multivibrator which alternately supplies a positive-going pulse on one of the leads 29, 30 simultaneously with a negative-going pulse on the other of these leads 29, 30 to render one of the tubes 24, 25 conductive and the other cutoff. When the tube 24 conducts, a first advance current pulse 32 is drawn through the windings 16, 16′, 16″. When the tube 25 conducts, a second advance voltage pulse 33 is produced at the anode of the tube 25. A source 31 of input pulses supplies negative-going pulses between the base 22 and emitter 19 of the first stage transistor 17 synchronously with the first advance pulses 27 or 32. The input pulse source 31 may be, for example, the output winding 15″ of the last stage 12 if it is desired to recirculate the information in the stepping register. However, if desired, a suitable synchronizing means (not shown) may interconnect the input pulse source 31 and the advance pulse in any suitable known manner. For example, the input source 31 may be a register from which information is gated synchronously with the advance pulses 32.

The relative senses of linkage of the windings on each core are indicated by dots adjacent one of the terminals of each winding in accordance with the usual convention. That is, if a current pulse is applied to the advance winding 16 with the conventional current flow into the dotted terminal of that winding 16 increasing in a positive sense, voltages induced in the input and output windings 14 and 15 are positive-going at the dotted terminals of those windings 14 and 15. Advance current pulses 32 applied to the windings 16, 16′, 16″ tend to drive the cores 13, 13′, 13″ simultaneously to a state designated herein as N.

The transistors 17, 17′, 17″ are normally operated with a zero emitter-base bias current to provide a very high collector-emitter resistance. A negative-going pulse applied to the base 22 of the transistor 17 draws emitter-base current, which results in a transition of minority current carriers across the emitter-base junction and a greatly lowered collector-emitter resistance. These minority carriers tend to remain in the base for some time (of the order of microseconds in most junction transistors) after the negative base voltage is removed. During the period that the number of minority carriers present in the base is substantially in excess of the number found under quiscent conditions, the collector-emitter resistance remains low. Thus, after a negative voltage pulse is applied to the base there is a temporary storage of the information represented by that negative pulse. The duration of this storage varies with the amplitude of the pulse. This storage is manifested in the form of a briefly contiuning low collector-emitter resistance, which is explained by the continuing excess of minority current carriers after the negative base pulse terminates. If sufficient emitter-collector current is drawn during the storage period, the excess carriers are swept out to restore the transistor to its normal state.

First, consider the operation with the first core 13 in state N. The first advance pulse 32 has only a negligible effect on the first core 13, driving that core 13 further into state N. Any voltage induced in the output winding 15 is insufficient in amplitude to affect the resistance of the transistor 17′. Accordingly, when the driving tube 25 is rendered conductive by the next second advance pulse 28, a negative advance voltage pulse 33 appears at the anode of the tube 25, and the emitter-collector path of the transistor 17′ in the anode circuit of the tube 25 is in the high resistance condition. As a result, the current pulse from the source 18 through the series circuit of the emitter-collector path of the transistor 17′, the second core input winding 14′, and the diode 21′ is very small in amplitude and insufficient to change the core 13′ from state N. This operation may be described as the transfer of state N from the first core 13 to the second core 13′. The succeeding stages 11 and 12 transfer state N in the same manner.

If the first core 13 is in state P, the first advance current pulse 32 drives the core 13 to state N and induces a pulse in the output winding 15 to draw emitter-base current in the transistor 17′. The transistor 17′ is driven to the low resistance condition and remains in that condition for a time after termination of the induced pulse. The transistor 17′ is still in the low resistance condition during the succeeding second advance voltage pulse 33, whereby a large magnetizing current is developed in the input winding 14′ of the second core 13′. This magnetizing current is in the direction to drive the second core 13′ to state P. Thus, if the first core 13 was in state P, a first advance pulse 32 drives it to state N, and the succeeding second advance pulse 33 drives the second core 13′ to state P to complete the transfer. When the second core 13′ is changed to state P, any voltage induced in the output winding 15′ is in the direction to make the base 22″ positive with respect to the emitter 19″. Consequently, the transistor 17″ is biased in the reverse direction which prevents any spurious transfer to the third core 13″.

The other stages 11 and 12 of the stepping register operate in the same manner. Information may be entered in the stepping register by applying signals to the base 22 of the first stage transistor 17 in synchronism with the first advance pulses 32. A negative-going input pulse may represent the binary digit one, and either the absence of a pulse or positive-going input pulse may represent the binary digit zero in accordance with the usual convention. Because the stages of this stepping register are substantially isolated from each other, information may also be entered in parallel, for example, by simultaneously applying pulses to the input windings, 14, 14′, 14″ or to additional input windings (not shown). The register may be cleared of all information by applying a number of first advance pulses 32 alternately with a corresponding number of advance pulses 33 equal to the number of stages 10, 11, 12. The circuit of FIGURE 1 may be used as a ring counter, with only one of the cores 13, 13′, 13″ in state P at any time. However, when used as a stepping register two adjacent cores, such as the first 13 and second 13′, may be in state P. Under such circumstances, the transistors 17′ and 17″ are both driven to the low resistance state when the first advance pulse 32 is applied. The next second advance pulse 33 tends to drive the second and third cores 13′ and 13″ to state P in the manner described above. However, the voltage induced in the second core output winding 15′ with the change of that core 14′ to state P biases the base-emitter path of transistor 17″ in the reverse direction (the base positive with respect to the emitter) and tends to sweep out the excess minority carriers. As a result, the emitter-collector resistance of the transistor 17″ presented to the second advance pulse 33 may be large, and the current pulse developed in the third core input winding 14″ may be insufficient in amplitude to turn over the third core 13″ to state P. By increasing the turns ratio of the input winding 14′ to the output winding 15′, the reverse bias voltage induced in the output winding 15′ by current flow in the input winding 14′ can be made very small. The ampere-turns required to turn over the cores remains constant. Thereby, this reverse bias voltage amplitude can be made sufficiently small so that only a relatively small number of minority carriers are swept out. Enough minority carriers are left to permit the development of a current pulse of sufficient amplitude to turn over the succeeding core. Alternatively, a separate diode (not shown) may be connected between each output winding and the emitter-base path of the associated transistor, which diode is poled to pass the forward-biasing voltage induced in the output winding and to block the reverse bias voltage. If such a diode is employed it should preferably be of the point-contact or bonded diode type which have a small amount of minority carrier storage available. The reason for using this type of diode is that its back resistance should remain high after passage of forward current and during the period of the second advance pulse 33.

The diodes 21, 21′ and 21″ are also preferably of the type having a small amount of minority carrier storage. These diodes 21, 21′, and 21″ isolate the stepping register stages from each other during the first advance pulse 32 and prevent spurious cross coupling which may otherwise occur due to the parallel connection of the input winding circuits in the anode circuit of the common tube 25.

The generator for the second advance pulse 33, shown as the tube 25, should provide a high-impedance during the period of the first advance pulse 32 in order to ensure no current flow through the transistors due to voltages induced in the input windings 14, 14′, 14″. This generator should also have a high frequency response and should pass the peak currents required to turn over the cores. In high speed operation, the largest part of the current through the tube 25 in a cycle may flow in the order of a few tenths of a microsecond.

The second advance pulse 33 may occur immediately after the first advance pulse 32. The stored minority carriers tend to diffuse out with time resulting in an increase of emitter-collector resistance at the same time. Therefore, the more closely the second pulse 33 follows the first pulse, the smaller is the impedance of the transistor and the smaller the power dissipation. The first pulse 32 may follow immediately after the second pulse 33, because any stored carriers in the transistors are swept out by the second pulse 33. Thus, the time delay of the transistor transfer circuit is essentially only that necessary to read information out of the cores and to write the information into the succeeding cores; that is, the turnover time of the cores themselves.

Figure 3:
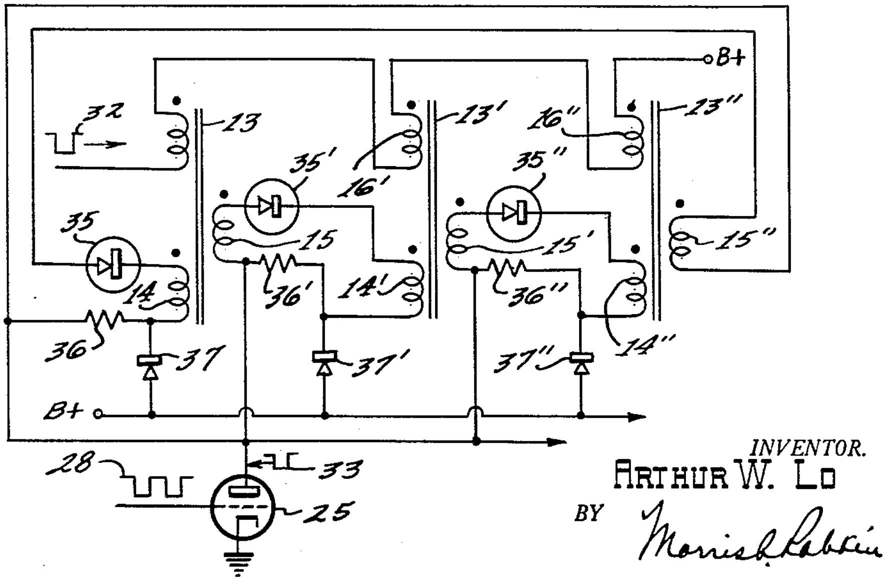
FIGURE 3 is a schematic circuit diagram of a ring counter, in which semiconductive diodes are employed as temporary storage elements.

In FIGURE 3, a three-stage ring counter is shown. Parts corresponding to those previously described are referenced by the same numerals. Each transfer circuit, for example that from the first core 13 to the second core 13′, is made up of a storage diode 35′, a resistor 36′, the first core output winding 15, and the second core input winding 14′, all connected in the same series circuit. The output winding 15″ of the last stage is connected in the same manner with the input winding 14 of the first stage. One terminal of each resistor 36, 36′, 36″ is connected to the anode of the common driving tube 25. The other terminal of each resistor 36, 36′, 36″ is connected through a separate isolating diode 37, 37′ 37″ to a source of direct voltage B+. The advance pulses 32 and 33 may be generated in the same manner as described in FIGURE 1. The relative senses of linkage of the windings are indicated by dots adjacent terminals of the windings and will be evident from the discussion that follows.

The storage diodes 35, 35′, 35″ (encircled to distinguish them from other diodes) normally have a low forward resistance and a high back resistance. When a pulse is applied to a diode 35 in the forward direction, there is a transition of minority carriers across the junction, and an excess of these carriers remain for a time after termination of the pulse. During the time that the excess minority carriers are present, the back resistance of the storage diode 35 is low. Thus, the information represented by a forward pulse applied to the diode 35 is stored for a time in the form of a low back resistance in that diode. The resistance 36 is between the large normal back diode resistance and the small back diode resistance in the storage condition.

In operation of the ring counter only one of the cores, for example, the first core 13, is in state P, and all the other cores are in state N. The first advance pulse 32 drives the first core 13 to state N, which induces a pulse in the output winding 15 to produce a current flow in the flow direction through the storage diode 35′. At the same time, the second core 13′ is also saturated to state N by the advance pulse 32. The sense of linkage of the second core input winding 14′ is such that this forward diode current flow tends to drive the second core 13′ further into state N so that the input winding 14′ presents but a negligible impedance to forward diode current. The next second advance pulse 33 draws a substantial current through the diode 37′, the second core input winding 14′ in the reverse direction through the storage diode 35′, and the first core output winding 15. The relatively large parallel resistance 36′ prevents a short-circuiting of the input winding 14′—storage diode 35′ circuit. The winding 15 has a negligible impedance, because this reverse current tends to saturate the first core 13 further into state N. Consequently, the second advance pulse 33 reverses the second core 13′ to state P.

The pulse induced in the second core output winding 15′ with the reversal of the second core 13′ to state P and the second advance pulse 33, both tend to draw current through the storage diode 35″ in the reverse direction. These pulses are blocked by the high back resistance of the diode 35″, which is in the quiescent condition at that time, and the third core 13″ remains in state N. The next first advance pulse 32 restores the second core 13′ to state N, and the succeeding second advance pulse 33 drives the third core 13″ to state P in the manner just described. The ring counter cycle is completed by the third core 13″ being restored to state N and the first core 13 being driven to state P.

Figure 4:
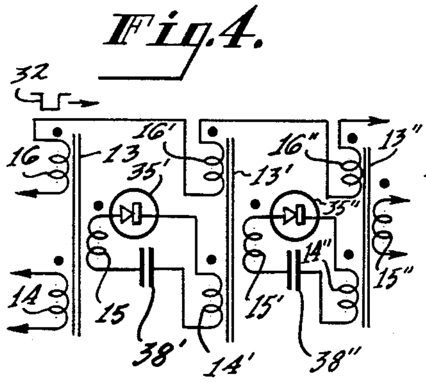
FIGURE 4 is a schematic circuit diagram of a modification of the circuit of FIGURE 3.

A modification of the ring counter of FIGURE 3 is illustrated in FIGURE 4. Parts corresponding to those previously described are referenced by the same numerals. A storage diode 35′ and a capacitor 38′ are connected in series between the first core output winding 15 and the second core input winding 14′. Similar transfer circuits are provided between the other cores that are adjacent in order. Only the train of advance pulses 32 for the advance windings 16, 16′, 16″ is required for this embodiment. If the first core is in state P, an advance pulse 32 reverses the core to state N resulting in current flow through the storage diode 35′ in the forward direction to charge the capacitor 38′. The duration of the advance current pulse 32 is only slightly greater than that of the current pulse in the output winding 15. As soon as the current in the forward direction through the diode 35′ falls, the charged capacitor 38′ begins to discharge and sends current through the diode 35′ in the reverse direction and through the windings 14′ and 15. Due to the minority carrier storage, the back resistance of the diode 35′ is low so that the discharge current may be sufficiently large to drive the second core 13′ to state P. By making the number of turns in the input winding 14′ greater than that in the output winding 15, the second core 13′ can be turned over by a smaller current in the input winding 14′ than the capacitor-charging current induced in the first core output winding 15. The state P is then transferred from the second core 13′ to the third core 13″ and, finally, from the third core 13″ to the first core 13 in the manner described above. Thus, in the embodiment of FIGURE 4, the diode 35′ stores information, and the capacitor stores the energy necessary to complete the transfer of state P. If a core such as the first core 13 is initially in state N, the capacitor 38′ of the following transfer circuit is not charged. Consequently, there is no available energy to reverse the succeeding core 13′ to state P, and that core 13′ remains in state N.

Figure 5:
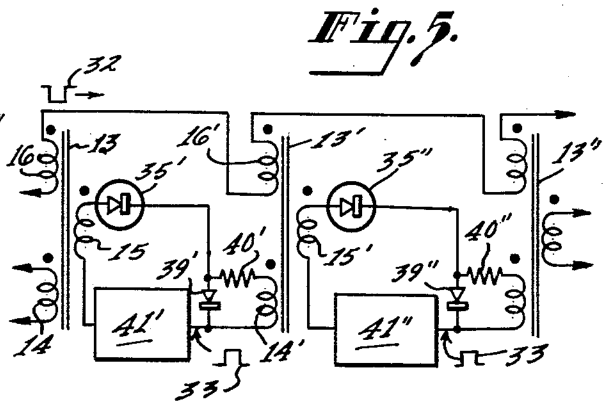
FIGURE 5 is a schematic circuit diagram of a stepping register incorporating features of the circuits of FIGURES 3 and 4.

In FIGURE 5 a modification of the circuit of FIGURES 3 and 4 is shown which may be employed as a stepping register. Each transfer circuit between two cores of adjacent order is the same as those of FIGURES 3 or 4 with the addition of a diode 39′ having a small amount of minority carrier storage. The diode 39′ is connected across the series combination of the input winding 14′ and a resistor 40′. The senses of linkage of the input and output windings 14′ and 15′ and the connection of the shunt diode 39′ are such that the diode 39′ passes the voltages induced in the winding 14′ or 15 when the core 13 or 13′ is changed to state N. A source 41′ of second advance pulses 33 is connected in the same series circuit with the shunt diode 39′, the storage diode 35′, and the output winding 15. The pulse source 41′ may be a capacitor (as capacitor 38′ shown in FIGURE 4), or the source 41′ may be a second advance pulse arangement like that of FIGURE 3. In general the pulse source 41′ may be characterized as having a low internal impedance when not supplying current. This low impedence is desirable when current is flowing in the forward storage diode direction so that the magntude of this current is sufficient to store the necessary minority carriers in the storage diode 35′. When the second advance pulse arrangement of FIGURE 3 is employed, the driver tube circuit may be transformer coupled across the resistors 36, 36′, and 36″ in order to isolate the storage diodes from the B+ supply.

If only the first core 13 is in state P, the first advance pulse 32 drives the core to state N to produce a forward current flow in the storage diode 35′ and the shunt diode 39′. Upon termination of this forward current current flow, a second advance pulse 33 from the source 41′ causes current to flow through the second core input winding 14′ and through the storage diode 35′ in the reverse direction to change the second core to state P. Because the shunt diode 39′ has a small carrier storage charactertistic, that diode 39′ continues to have a large back resistance after forward current flow and, thereby, prevents bypass of the second core input winding 14′.

If both the first and second cores 13 and 13′ are in state P, a first advance pulse 32 returns both cores 13 and 13′ to state N to produce currents flowing through both the first core output winding 15 and the second core input winding 14′. Both of these currents are passed through the shunt diode 39′. Because of the shunt diode, the voltage induced in the second core input winding 14′ with the turn over of the second core 13′ has substantially no effect upon forward conduction through the storage diode 35′. Accordingly, both storage diodes 35′ and 35″ conduct in the forward direction with the advance pulse 32. Thus, the pulses 33 from the sources 41′ and 41″ are passed by the storage diodes 35′ and 35″ in the back direction to turn over the second and third cores 13′ and 13″ to state P.

The resistance 40′ in series with the input widing 14′ should be large enough to prevent an excessive loading on the advance winding 16′ due to induced current flow in the input winding 14′ when the second core 13′ is changed to state N. If this resistance 40′ is not sufficiently large the loading of the advance pulse 32 by the input winding circuit may be such as to prevent a reversal of the magnetic state of the core 13′. The resistance 40′ must also be small enough compared to the back resistance of the shunt diode 39′ so that most of the current supplied by the source 41′ flows through the input winding 14′.

When core 13′ is driven to state P by current flow in the input winding 14′, there is a voltage induced in the output winding 15′ which is in series aiding to the second advance pulse 33. The amplitude of this induced voltage may be controlled by the turns ratio of the input winding 14′ to the output winding 15′ as discussed above. However, this induced voltage in the output winding at most increases the amplitude of the pulse 33 and does not oppose the effect of that pulse 33 or otherwise introduce spurious information into the transfer circuit.

Figure 6:
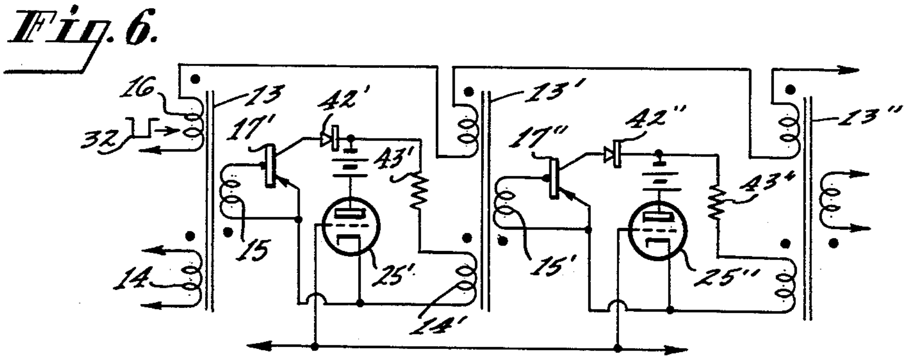
FIGURE 6 is a schematic circuit diagram of a modification of the circuit of FIGURE 1 for performing the logical operation of negation.

A modification of the circuit of FIGURE 1 is shown in FIGURE 6. In the circuit of FIGURE 6 separate second advance pulse driver tube circuits 25′ and 25″ for each stage are shown. The common tube circuit 25 and isolating diodes 21, 21′, 21″ of FIGURE 1 may be used in place of the individual circuits 25′, 25″ if desired. The circuit of FIGURE 6 differs from that of FIGURE 1 in that the collector-emitter path of the transistor 17′ is connected to provide a shunt impedance to the input winding 14′ with respect to the driver tube circuit 25′. In addition, a blocking diode 42′ is connected in that shunt impedance path, which diode 42′ is poled to pass emitter-collector current in the forward direction. A resistor 43′ and the input winding 14′ are connected in series and, also, across the driver tube 25′ circuit. The resistance of resistor 43′ is between the high and low resistances of the emitter-collector path. The other stages are similarly connected.

When the first core 13 is changed from state P to state N by a first advance pulse 32, the transistor 17′ is driven to the low resistance condition by the pulse induced in the output winding 15. The next second advance pulse produced by the tube 25′ draws a substantial current through the low resistance of the emitter-collector path of the transistor 17′ and but a negligible current through the input winding 14′ due to the resistance 43′. Consequently, the second core 13′ remains in state N. Thus, if the first core 13 is in state P, the second core 13′ is left in state N.

If the first core 13 is initially in state N, the first advance pulse 32 has no effect on that core 13, and the transistor 17′ remains in the high resistance condition. The next second advance pulse draws a substantial current through the second core input winding 14′ since the resistance 43′ is substantially less than the high emitter-collector resistance of the transistor 17′. Thus, if the first core 13 is in state N, a transfer operation results in the second core 13′ being driven to state P. Accordingly, by means of the circuit FIGURE 6 the operation of negation is carried out. If a first advance pulse 32 reverses both the first and the second cores 13 and 13′ from state P to N, the blocking diode 42′ prevents induced current flow in the input winding 14′ from affecting the storage of carriers in the transistor 17′. The circuit of FIGURE 6 may be employed in various circuit configurations which, from the description herein will now be apparent to those skilled in the art, to operate as an inhibit gate or "and not" gate.

Figure 7:
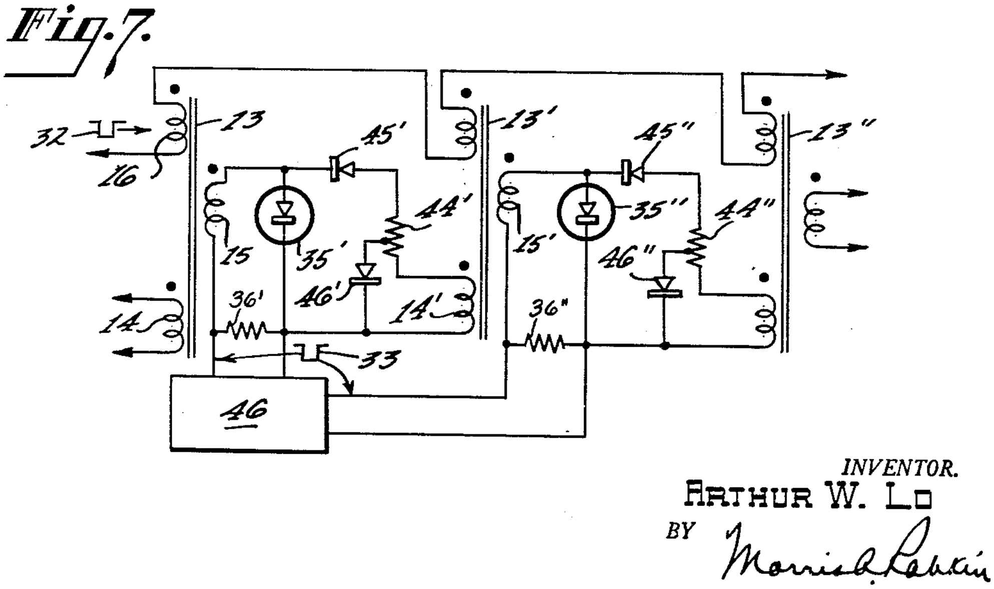
FIGURE 7 is a schematic circuit diagram of a modification of the circuit of FIGURE 5 for performing the logical operation of negation.

The circuit of FIGURE 7 may also be employed to carry out the logical operation of negation. In the circuit of FIGURE 7, which illustrates a modification of the circuit of FIGURE 5, the transfer circuit between the first and second cores 13 and 13′ includes the storage diode 35′ connected across the series combination of the output winding 15 and a load resistor 36′. The storage diode 35′ is also connected across the series combination of a resistor 44′, a blocking diode 45′ and the input winding 14′. A shunt diode 46′ is connected from a tap on the resistor 44′ across the winding 14′ to carry current in the forward direction from the tap to the unmarked terminal of the winding 14′. The storage diode 35′ is poled to pass in the forward direction currents induced in the windings 15 and 14′ when the cores 13 and 13′ are restored to state N. The diode 45′ is poled to pass currents induced in the input winding 14′ and to block currents induced in the output winding 15 when the respective cores 13′ and 13 are driven to state N. The resistance 44′ is large compared to the back resistance of the storage diode 35′ when in the minority carrier storage condition. The transfer circuits between the other cores of adjacent order are the same as that just described. A source 46 of second advance pulses 33 similar to that of FIGURE 3 is provided with isolated connections across the resistors 36′, 36″ of the stages.

When the first core 13 is in state P, a first advance pulse 32 reverses that core 13 to state N. The resulting current flow in the output winding 15 is in the forward direction of the storage diode 35′ and is blocked by the diode 45′. The next second advance pulse 33 is passed in the back direction of the storage diode 35′ through the output winding 15, and there is a negligible current flow through the second core input winding 14′ due partly to the resistance 44′. Thus, the second core 13′ remains in state N.

When the first core 13 is in state N, the first advance pulse 32 has no affect on that core 13 so that there is no forward conduction through the storage diode 35'. The second advance pulse 33 is blocked by the normally large reverse resistance of the storage diode 35' and causes current flow through the second core input winding 14' to change that core 13' to state P. Thus, this circuit may also be used to perform negation.

If the second core 13' is driven to state N by the first advance pulse 32 while the first core 13 remains unchanged in state N, most of the induced current in the input winding 14' flows through the shunt diode 46'. Consequently, there is a negligible current in the forward direction through the storage diode 35', which current is insufficient to produce enough storage carriers in the diode 35' to lower its back resistance.

A stage of a stepping register may be used as a basic storage unit and delay unit in various information handling circuits. For example, a bistable trigger circuit utilizing a single core may be provided by connecting the output winding of the core back to its input winding through a temporary storage transfer circuit. The core may be set to state P by another winding on the core. Once set, successive advance pulses transfer the information represented by that state out of the core and back in again. The core may be reset by inhibiting the transfer of a pulse back to the input winding. Another use of this invention is as an "or" gate: the output windings of a plurality of parallel storage cores may be coupled through a transfer circuit to the input winding of a single core. With a negation circuit and an "or" gate, and "and" or coincidence gate may be provided. Furthermore, the information stored in one core may be transferred to a plurality of cores through a single transfer circuit.

Point contact transistors and diodes and bonded diodes may also be employed as temporary storage elements in this invention. Under such circumstances, the blocking, isolating, and shunt diodes that are used should have substantially less minority carrier storage than the storage semiconductors. For storage purposes, the junction type semiconductors are preferred, because they provide a much greater amount of carrier storage than the point contact type.

Thus, by means of this invention a new and improved circuit is provided for transferring signals between binary elements that have a rectangular hysteresis characteristic. A ring counter and stepping register unit is provided that is not limited in speed by the temporary storage element. By means of these stepping register units various storage, switching, and logical operations can be performed.

What is claimed is:

1. A binary circuit comprising a first binary element, a second binary element, first means for simultaneously applying signals to said elements to change them from one binary state to the other, said first element producing signals of one polarity with changes to one of said states, and means for controlling changes of state of said second element in accordance with said signals produced by said first element, said controlling means including second means operative after said first means for applying signals to said second element to change it from said other to said one state, and means for presenting a resistance of one magnitude to said second means signals in the absence of said one polarity signals, said resistance means being responsive to said one polarity signals for presenting a resistance of different magnitude to said second means signals for a time after termination of said one polarity signals and at the time of operation of said second means.

2. An information handling circuit comprising a plurality of information storage elements having two binary states, first means for simultaneously applying signals to said elements to change said elements in one of said states to the other of said states, said elements producing first and second signals respectively when changed from said one and said other states, and means for transferring information from a first one of said elements to a second one of said elements, said transfer means including second means operative in predetermined time relationship to said first means for applying signals to said second element subsequent to termination of said first signals produced by said first element to change said second element to said one state, and means coupled between said first and second elements and responsive to said first element first and second signals for respectively presenting resistances of different magnitudes to said second means signals to enable and to inhibit said second means signals respectively.

3. An information handling circuit comprising a plurality of information storage elements having two binary states, first means for applying signals to said elements to change said elements in one of said states to the other of said states, said elements producing first and second signals respectively when changed from said one and said other states, and means for transferring information from a first one of said elements to a second one of said elements, said transfer means including second means operative in predetermined time relationship to said first means for applying to said second element subsequent to termination of said signals produced by said first element signals tending to change said second element to said one state, and signal storage means coupled between said first and second elements and responsive to said first element first and second signals for respectively presenting resistances of different magnitudes in series with said second means for a time subsequent to termination of said signals produced by said first element.

4. A circuit as recited in claim 2 wherein said resistance presenting means includes a semiconductive device responsive to said first element first signals for producing an excess of current carriers.

5. A circuit as recited in claim 4 wherein said semiconductive device has base, collector, and emitter electrodes, said base and emitter being connected to receive said first element signals, and said emitter and collector being connected in a series circuit with said second means.

6. A circuit as recited in claim 4 wherein said semiconductive device has a low forward resistance, a low reverse resistance in response to said first element second signals, and a high reverse resistance in response to said first element second signals, said device being connected to present said forward resistance to said first element first signals and said reverse resistance to said second means signals.

7. An information handling circuit comprising a plurality of information storage elements having two binary states and operatively arranged in serial order first means for applying signals to said elements to change said elements in one of said states to the other of said states, said elements producing different signals respectively when changed from said one and said other states, and means for transferring information from each of said elements to the succeeding one of said elements in said order, said transfer means including second means operative in predetermined time relationship to said first means for applying to said elements subsequent to termination of said signals produced by said elements signals tending to change said elements to said one state, and separate signal storage means coupled between elements of adjacent order and responsive to said different signals produced by the associated preceding order element for respectively presenting resistances of different magnitudes in series with said second means for a time subsequent to termination of said signals produced by said elements.

8. A binary circuit comprising a first and a second device each having two remanent states, first means for applying signals to said devices at the same time to change them from one to the other of said remanent states, said devices producing output signals upon changing state, a transistor having emitter, collector, and base electrodes, means connecting said first device to said base and said emitter to apply said first device output signals to the emitter-base path of said transistor to change the resistance of said emitter-collector path, means connecting said emitter and collector electrodes to said second device, and second means operative only after termination of said first device output signals for applying to said second device and to said emitter-collector path of said transistor signals tending to change the state of said second device depending on the resistance of said emitter-collector path.

9. A binary circuit comprising a first and a second device each having two states, first means for applying signals to said devices to change them from one to the other of said states, said devices producing output signals upon changing state, a diode having a relatively low forward resistance and a relatively low back resistance for a time subsequent to passage of forward current and having a relatively high back resistance in the absence of said forward current, means connecting said diode in circuit with said devices, first means for changing the state of said first device to produce current flow in the forward direction through said diode, and second means operative in predetermined time relationship after said first means for applying to said circuit connecting means during said low resistance time a pulse that tends to change the state of said second element and that tends to produce current in the back direction through said diode.

10. An information handling circuit comprising a plurality of magnetic storage elements having two binary states, first means for applying signals to said elements to change said elements in one of said states to the other of said states, said elements producing first and second signals respectively when changed from said one and said other states, and means for transferring information from a first one of said elements to a second one of said elements, said transfer means including second means operative in predetermined time relationship to said first means for applying signals to said second element subsequent to termination of said signals produced by said first element to change said second element to said one state, and signal storage means coupled between said first and second elements and responsive to said first element first and second signals for respectively presenting resistances of different magnitudes in series with said second means for a time subsequent to termination of said signals produced by said first element.

11. A magnetic circuit comprising a first magnetic element, a second magnetic element, each of said elements having two binary states, separate windings linked to said elements, first means for changing the state of said first element to induce pulses in said first element winding, second means for applying pulses to said second element winding subsequent to the operation of said first means to change the state of said second element, and means for presenting a resistance of one magnitude to said second means pulses in the absence of said induced pulses, said resistance means being responsive to said induced pulses for presenting a resistance of different magnitude to said second means pulses for a time after termination of said induced pulses and at the time of operation of said second means.

12. A magnetic circuit comprising a first magnetic core, a second magnetic core, each of said cores having two stable, remanent states, a semiconductive device characterized by a minority carrier storage effect, means for changing the remanent state of said first core, means responsive to said change of state of said first core for applying an electrical signal to said device to produce an excess of minority carriers therein, and means operative in a predetermined time relationship after said first core changing means and only after the time for a change of state of said first core and connected in series with said semiconductive device for changing the remanent state of said second core only when said minority carrier excess is stored in said semiconductive device and in accordance therewith.

13. A magnetic circuit comprising a magnetic core having two binary states, an input winding linked to said core, storage means including a semiconductive device characterized by a minority carrier storage effect and responsive to two different signals for respectively providing a resistance of different magnitudes in series with said input winding subsequent to termination of said signals, means for supplying said signals to said semiconductive device, and means operative in predetermined time relationship to said signal supplying means for applying voltages to said input winding and semiconductive resistance subsequent to termination of said signals, said voltages being in a direction tending to change the state of said core, whereby said two core states are respectively produced in accordance with the different signals supplied to said semiconductive device.

14. A magnetic circuit comprising a plurality of magnetic elements having two binary states, first means for applying magnetizing forces to said elements to change said elements in one of said states to the other of said states, separate input and output windings linked to said elements, and a transfer circuit connected between said output winding of a first one of said elements and said input winding of a second one of said elements, said transfer circuit including second means operative after said first means for applying a voltage to said second element input winding in a direction tending to change said second element to said one state, and a semiconductive device coupled between said first element output winding and said second element input winding, said semiconductive device being responsive to a voltage induced in said first element output winding when said first element is changed to said other state for providing a relatively low resistance in series with said second means for a time after termination of said induced voltage, said semiconductive device providing a relatively high resistance in series with said second means in the absence of said induced voltage.

15. A magnetic circuit comprising a plurality of magnetic elements each having two stable, remanent states, separate input and output windings linked to said elements, means for applying a pulse to said first element input winding in a direction to change said first element from one to the other of said remanent states, a transistor having emitter, collector and base electrodes, means connecting said output winding of a first one of said elements in series with the emitter-base path of said transistor to apply pulses induced in said output winding to said path, said induced pulses being of either relatively large or small amplitude corresponding to whether said first element changes or not from one to the other of said remanent states, and means for supplying pulses to said input winding of a second one of said elements only after the time for termination of said induced pulses, said pulse supplying means being connected in series with the emitter-collector path of said transistor said pulse applied to said second element input winding changing said second element from one to the other of said remanent states when said induced pulse is of a relatively large amplitude and not changing said second element remanent state when said induced pulse is of relatively small amplitude.

16. A magnetic circuit comprising a plurality of magnetic elements each having two remanent states, an output winding linked to a first one of said elements, an input winding linked to a second one of said elements, a storage diode, means connecting said diode between said windings, means for applying magnetizing forces to said elements to change said remanent elements in one of said states to the other of said remanent states, said first element in changing to said other state producing a current flow through said output winding and in the forward direction through said diode, and through said input winding of said second element, the sense of linkage of said input winding being such that current in the said forward direction does not tend to change the state of said second element and current in the back direction through said diode and through said input winding tends to change said second element to said one remanent state, and means for applying pulses to said connecting means after the remanent state of said first element is changed to produce current in the back direction through said diode and through said input winding.

17. A magnetic circuit comprising a plurality of magnetic elements each having two binary states, separate first windings and separate second windings linked to said elements, a diode characterized by having a relatively low forward resistance and a relatively low back resistance for a time subsequent to passage of forward current and having a relatively high back resistance in the absence of said forward current, means connecting said diode in circuit with said first winding of a first one of said elements and a second winding of a second one of said elements, first means for changing the state of said first element to produce current flow in the forward direction through said diode, and second means operative in predetermined time relationship after said first means for applying to said circuit connecting means during said low resistance time a pulse that tends to produce current in the back direction through said diode and that tends to produce current through said second element second winding in a direction to change the state of said second element.

18. A magnetic circuit comprising a plurality of magnetic elements having two binary states and operatively arranged in serial order, first means for simultaneously applying magnetizing forces to said elements to change said elements in one of said states to the other of said states, separate input and output windings linked to said elements, second means operative in predetermined time relationship after said first means for applying voltages to each of said input windings in a direction tending to change said elements to said other state, and a separate semiconductive device coupled between each of said output windings and said input winding of the succeeding one of said elements in said order, each of said semiconductive devices being responsive to a voltage induced in the associated output winding when the associated magnetic element is changed to said other state for providing a relatively low resistance in series with said second means for a time after termination of said induced voltage, each of said semiconductive devices providing a relatively high resistance in series with said second means in the absence of said induced voltage.

19. A magnetic circuit as recited in claim 18 wherein each of said semiconductive device has emitter, collector, and base electrodes, the emitter-base path of each of said semiconductive devices being connected to receive said induced voltage in the associated output winding, the emitter-collector path of each of said semiconductive devices being connected in the same series circuit with said second means and the associate input winding.

20. A magnetic circuit as recited in claim 18 wherein each of said semiconductive devices is a diode poled to receive in the forward direction said induced voltage in associated output winding, said diode being connected in the same series circuit with the associated output and input windings and said second means.

21. A binary circuit comprising a first binary element, a second binary element, means for simultaneously applying signals to said elements to change them from one binary state to the other, said first element producing signals of one polarity with changes to one of said states, and means for controlling changes of state of said second element in accordance with said signals produced by said first element, said controlling means including means for producing a resistance of one magnitude in the absence of said one polarity signals, said resistance means being responsive to said one polarity signals for providing a resistance of different magnitude for a time after termination of said one polarity output signals, and means for storing the energy of said one polarity signals and for applying signals to said second element and to said different magnitude resistance upon termination of said one polarity signals.

22. An information handling circuit comprising a plurality of information storage elements having two states, first means for simultaneously applying signals to said elements to change said elements in one of said states to the other of said states, said elements producing first and second signals respectively when changed from said one and said other states, and means for transferring information from a first one of said elements to a second one of said elements, said transferring means including means coupled between said first and second elements and responsive to said first element first and second signals for respectively providing resistances of different magnitudes for a time after termination of said first and second signals, and means for storing the energy of said first signals and for applying signals to said second element and to said resistance providing means upon termination of said first signals.

23. An information handling circuit comprising a plurality of information storage elements having two states and operatively arranged in serial order, first means for applying signals to said elements to change said elements in one of said states to the other of said states, said elements producing different signals respectively when changed from said one and said other states, and means for transferring information from each of said elements to the succeeding one of said elements in said order, said transfer means including separate information storage means coupled between said elements of adjacent order and responsive to said different signals produced by the associated preceding order element for providing a signal path having different impedance magnitudes respectively for a time after termination of said different signals, and means for storing the energy of one of said different signals and for applying signals to said elements and to said signal paths upon termination of said different signals.

24. A binary circuit comprising a first and a second device each having two states, first means for applying signals to said devices to change them from one to the other of said states, said devices producing output signals upon changing state, a diode having a relatively low forward resistance and a relatively low back resistance for a time subsequent to passage of forward current and having a relatively high back resistance in the absence of said forward current, means connecting said diode in circuit with said devices, first means for changing the state of said first device to produce current flow in the forward direction through said diode, and energy storing means connected in circuit with said diode and said second device to receive said forward current and to supply energy to said second device by way of said diode upon termination of said forward current.

25. A magnetic circuit comprising a plurality of magnetic elements having two stable states, means for applying magnetizing forces to said elements to change their states, separate windings linked to said elements, a diode, and a capacitor connected in the same series circuit with said windings and said diode.

26. A magnetic circuit comprising a plurality of magnetic elements having two stable states, means for simultaneously applying magnetizing forces to said elements, separate windings linked to said elements, a diode characterized by a minority carrier storage effect and having a relatively low back impedance for a time after forward current flow and a high back impedance in the absence of said forward current flow, and a capacitor connected in the same series circuit with said windings and said diode.

27. A magnetic circuit comprising a plurality of magnetic elements having an ordinal relationship and each having two states, means for simultaneously applying magnetizing forces to said elements to change their states, separate input and output windings linked to said elements, and a plurality of transfer circuits each coupled between said output winding of one of said elements and said input winding of the element of succeeding order, each of said transfer circuits including a different diode, and a different capacitor connected in the same series circuit with said diode of the same transfer circuit and the associated ones of said input and output windings.

28. In combination, a pair of magnetic cores, each of said cores having at least a signal winding coupled thereto, and a closed bi-directional transfer loop intercoupling the said signal windings of said magnetic cores, said closed loop including at least an electrostatic storage device connected in series circuit relationship with said windings, said storage device having a storage capacity sufficient for storing the energy generated in one of said windings during a change of state of the corresponding magnetic core and being effective to transfer said stored energy through the said one winding to the other winding of said loop upon the change of magnetic state of said corresponding magnetic core for changing the state of the other magnetic core.

29. The combination as defined in claim 28 wherein said electrostatic storage device comprises a reactive impedance device proportioned to store the energy derived from said signal winding, and a resistive impedance device connected in series circuit relationship with said reactive impedance device, said resistive impedance device being proportioned to prevent oscillation in said transfer loop.

30. In combination, a first magnetic core having at least a shift winding and a signal winding coupled thereto, a second magnetic core having at least a shift winding and a signal winding coupled thereto, and a closed transfer loop intercoupling the said signal windings of said first and second magnetic cores, said closed loop including at least an electrostatic storage device connected in series circuit relationship with said windings, said storage device having a storage capacity sufficient for storing the energy resulting upon the energization of one of the shift windings for changing the state of the corresponding one of said first and second magnetic cores, said storage device being further arranged to release said stored energy through the corresponding signal winding for the said energized shift winding to the other signal winding upon the change of state of said corresponding one magnetic core in response to the energization of said one shift winding.

31. A bistable element comprising first and second magnetic cores; each of said magnetic cores having a substantially rectangular hysteresis loop, and each having a signal winding and a shift winding coupled to said cores; a bi-directional transfer loop intercoupling said signal windings of said first and second magnetic cores; said transfer loop including a capacitive reactance device connected in said loop in series circuit relationship with said windings; said capacitive device being proportioned to receive and retain electrical energy during the interval said first or second magnetic core is caused to traverse a portion of said hysteresis loop in response to the energization of the corresponding shift winding for the said core and to discharge the energy through the said corresponding signal winding and through said signal winding for the other magnetic core to cause the latter core to change state.

32. A magnetic core device including; first and second magnetic cores, each of said cores having a substantially rectangular hysteresis loop and having a signal winding coupled to each of said cores, and a transfer loop interconnecting each of said signal windings, said loop including a capacitor and a minority carrier storage device connected in series circuit relationship with said windings.

33. In combination; first and second bistable magnetic cores; a transfer loop intercoupling said first and second cores, said loop comprising an output winding coupled to said first core, an input winding coupled to said second core, a capacitor and a diode all connected in series, said diode being characterized by offering relatively low impedance to current in the forward direction therethrough and for a short time immediately following passage of forward current also offering relatively low impedance to current in the backward direction but offering relatively high impedance to current in the back direction in the absence of such forward current; input means for driving current through said diode in the forward direction; and means coupled to said second core for detecting the flow of a substantial amount of back-direction current, thereby to detect the prior occurrence of forward current.

References Cited in the file of this patent

UNITED STATES PATENTS

| | | |
|---|---|---|
| 2,644,893 | Gehman | July 7, 1953 |
| 2,652,501 | Wilson | Sept. 15, 1953 |
| 2,695,993 | Haynes | Nov. 30, 1954 |
| 2,710,928 | Whitney | June 14, 1955 |
| 3,101,417 | Elmore | Aug. 20, 1963 |

FOREIGN PATENTS

| | | |
|---|---|---|
| 730,165 | Great Britain | May 18, 1955 |

UNITED STATES PATENT OFFICE
CERTIFICATE OF CORRECTION

Patent No. 3,153,778 October 20, 1964

Arthur W. Lo

It is hereby certified that error appears in the above numbered patent requiring correction and that the said Letters Patent should read as corrected below.

Column 4, line 50, for "14'" read -- 13' --; column 5, line 72, for "flow" read -- forward --; column 7, line 20, strike out "current", second occurrence.

Signed and sealed this 16th day of February 1965.

(SEAL)
Attest:

ERNEST W. SWIDER
Attesting Officer

EDWARD J. BRENNER
Commissioner of Patents